US010502961B2

(12) United States Patent
Miyao et al.

(10) Patent No.: US 10,502,961 B2
(45) Date of Patent: Dec. 10, 2019

(54) VIRTUAL IMAGE DISPLAY APPARATUS

(71) Applicant: SEIKO EPSON CORPORATION, Tokyo (JP)

(72) Inventors: Toshiaki Miyao, Matsumoto (JP); Takahiro Totani, Suwa (JP); Masayuki Takagi, Matsumoto (JP); Takashi Takeda, Suwa (JP); Akira Komatsu, Tatsuno-machi (JP); Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/059,743

(22) Filed: Aug. 9, 2018

(65) Prior Publication Data
US 2018/0348530 A1    Dec. 6, 2018

Related U.S. Application Data

(63) Continuation of application No. 15/371,079, filed on Dec. 6, 2016, now Pat. No. 10,073,273.

(30) Foreign Application Priority Data

Dec. 28, 2015  (JP) .................. 2015-256068

(51) Int. Cl.
*G02B 27/14*   (2006.01)
*G02B 27/01*   (2006.01)
*F21V 8/00*    (2006.01)

(52) U.S. Cl.
CPC ....... *G02B 27/0176* (2013.01); *G02B 6/0001* (2013.01); *G02B 27/0172* (2013.01); *G02B 2027/011* (2013.01); *G02B 2027/015* (2013.01); *G02B 2027/0132* (2013.01); *G02B 2027/0152* (2013.01); *G02B 2027/0169* (2013.01); *G02B 2027/0178* (2013.01); *G02B 2027/0198* (2013.01)

(58) Field of Classification Search
CPC .................................. G02B 27/0176
USPC ........................................ 359/633
See application file for complete search history.

(56) References Cited

U.S. PATENT DOCUMENTS

2009/0180194 A1   7/2009  Yamaguchi et al.
2010/0046070 A1   2/2010  Mukawa
2012/0229367 A1   9/2012  Magyari
(Continued)

FOREIGN PATENT DOCUMENTS

JP    2010-048998 A    3/2010
JP    2013-511744 A    4/2013
(Continued)

OTHER PUBLICATIONS

Feb. 8, 2018 Office Action issued in U.S. Appl. No. 15/371,079.
May 18, 2018 Notice of Allowance issued in U.S. Appl. No. 15/371,079.

*Primary Examiner* — James C. Jones
(74) *Attorney, Agent, or Firm* — Oliff PLC

(57) ABSTRACT

In a frame part, a center portion having a thick structure is provided between a first optical member as a first light guide unit and a second optical member as a second light guide unit to connect to both and fixes relative positions of the first optical member and the second optical member by the center portion, and thereby, reduction in weight and size of the frame part is realized.

20 Claims, 11 Drawing Sheets

(56) References Cited

U.S. PATENT DOCUMENTS

| | | |
|---|---|---|
| 2013/0181888 A1 | 7/2013 | Kuriya et al. |
| 2014/0139927 A1 | 5/2014 | Hiraide |
| 2014/0232619 A1* | 8/2014 | Hiraide .............. G02B 27/0172 345/8 |
| 2016/0284129 A1 | 9/2016 | Nishizawa et al. |

FOREIGN PATENT DOCUMENTS

| | | |
|---|---|---|
| JP | 2013-150118 A | 8/2013 |
| JP | 2014-092696 A | 5/2014 |
| JP | 2014-160112 A | 9/2014 |
| WO | 2007/037089 A1 | 4/2007 |

* cited by examiner

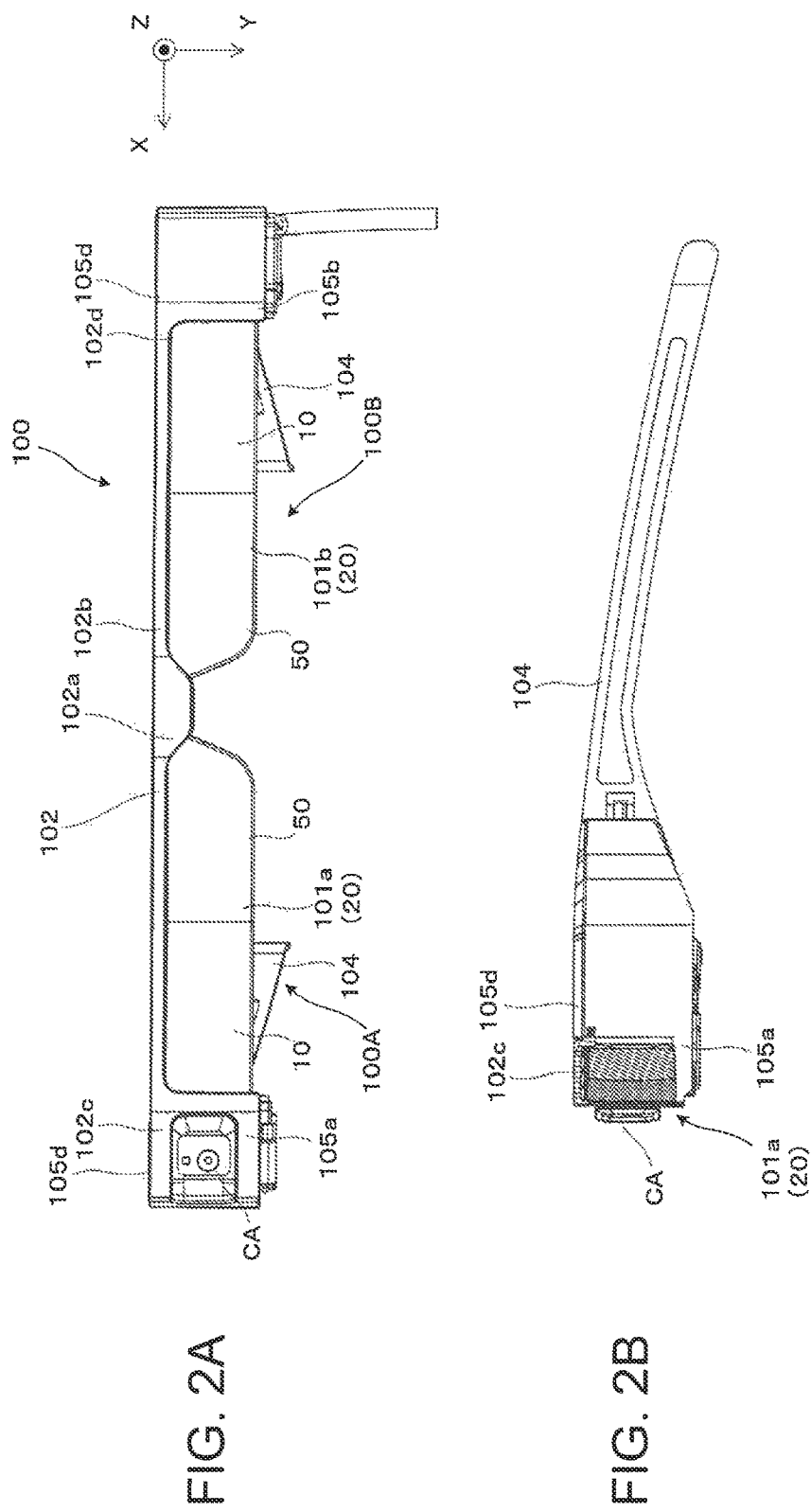

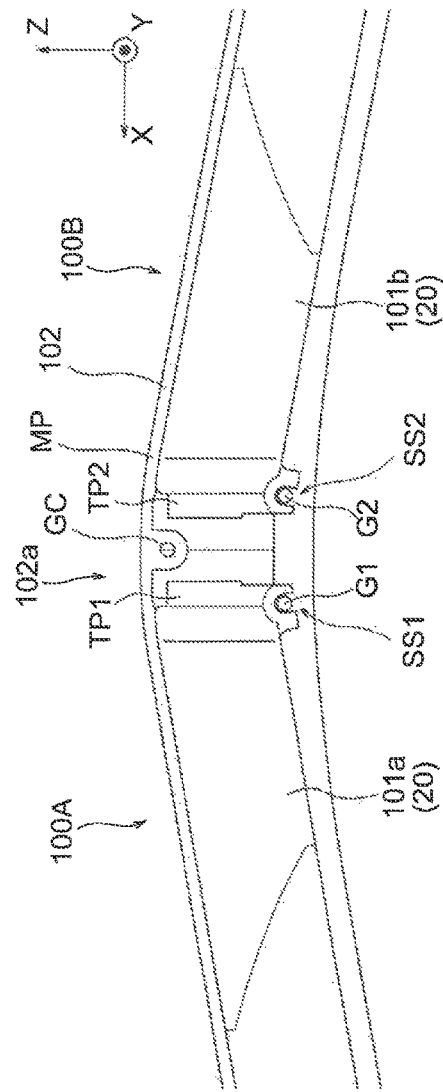
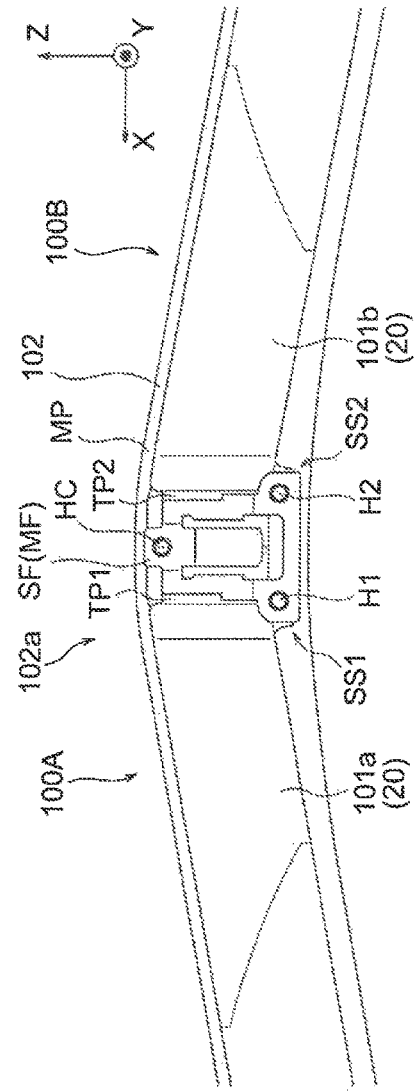
FIG. 8A
FIG. 8B

VIRTUAL IMAGE DISPLAY APPARATUS

CROSS-REFERENCE TO RELATED APPLICATION

This application is a Continuation of U.S. application Ser. No. 15/371,079 filed Dec. 6, 2016, and is based on and claims the benefit of priority from earlier Japanese Patent Application No. 2015-256068 filed Dec. 28, 2015, the description of which is incorporated herein by reference.

BACKGROUND

1. Technical Field

The present invention relates to a virtual image display apparatus that presents images formed by an image display device or the like to an observer.

2. Related Art

As virtual image display apparatuses including head mount displays (hereinafter, referred to as HMDs) attached to heads of observers, binocular-type apparatuses provided with a pair of left and right display apparatuses and respectively projecting picture lights to both eyes are known (see Patent Document 1 (JP-A-2014-2696), Patent Document 2 (JP-A-2014-160112), and Patent Document 3 (JP-A-2010-48998)). In this case, if image display misalignment between left and right in binocular vision is significant (for example, misalignment of several pixels or more is produced), the observer may be difficult to continue viewing of pictures because recognition in perfect alignment of left and right images is impossible. Therefore, in the binocular-type virtual image display apparatus, it is very important that the pair of left and right display apparatuses are firmly positioned and fixed so that the relative misalignment between the apparatuses for right eye and left eye may not be larger, and have sufficient strengths so that distortion of the product or the like may not be produced after assembly of the respective parts.

Accordingly, for example, in Patent Documents 1, 2, the display apparatus for right eye and the display apparatus for left eye are respectively concentrically assembled to nearly one locations of a metal frame (for example, see FIG. 7 of Patent Document 1), and image display misalignment between left and right is suppressed with accuracy as optical systems maintained. That is, the accuracy and the strength are provided to the metal frame, and thereby, misalignment between left and right display apparatuses is prevented.

On the other hand, the observer wears the virtual image display apparatus, and thus, there are strong demands for reduction in weight and size. However, as described above, for example, to maintain the sufficient accuracy and strength in the metal frame, reduction in weight and size of the frame part is naturally restricted.

SUMMARY

An advantage of some aspects of the invention is to provide a virtual image display apparatus that may suppress image display misalignment between left and right in binocular vision with reduced weight and size of the whole apparatus.

A virtual image display apparatus according to an aspect of the invention includes first and second light guide units provided in a pair corresponding to left and right eyes and respectively guiding picture lights to be visually recognized, and a frame part including a center portion having a thick structure provided to connect to both the first light guide unit and the second light guide unit and fixing relative positions of the first light guide unit and the second light guide unit.

In the virtual image display apparatus, in the frame part, the center portion having the thick structure is provided between the first light guide unit and the second light guide unit to connect to both units and the relative positions of the first light guide unit and the second light guide unit may be fixed by the center portion, and thereby, for example, in comparison to a configuration in which the frame part serves to support and fix the whole optical system in an integrated fashion, reduction in weight and size of the frame part and reduction in weight and size of the whole apparatus may be realized and image display misalignment between left and right in binocular vision may be suppressed by the center portion.

In a specific aspect of the invention, the first and second light guide units respectively have protruding portions on end sides extending toward the center portion, and the center portion forms the thick structure while sandwiching and fixing the protruding portions of the first and second light guide units. In this case, the protruding portions of the first and second light guide units are sandwiched and fixed, and thereby, the thick structure may be formed and sufficient assembly strength for suppression of image display misalignment between left and right may be maintained in the center portion.

In another aspect of the invention, the frame part has a support extending from the center portion along the first and second light guide units, the support forms first and second periphery portions corresponding to base sides of the first and second light guide units, respectively, and the first and second light guide units are connected and fixed to the first and second periphery portions of the support, respectively. In this case, the respective light guide units are fixed in two parts apart from each other on the center sides closer to the nose and the periphery sides closer to the ears when worn, and image display misalignment between left and right may be further suppressed.

In still another aspect of the invention, the first and second light guide units are connected to first and second lens tube parts respectively housing first and second projection lenses for allowing picture lights from a picture device (image display device) to enter the first and second light guide units on base sides, respectively, and connected and fixed to the frame part via the first and second lens tube parts, respectively. In this case, the first and second light guide units may be fixed to the frame part via the first and second lens tube parts.

In still another aspect of the invention, the first and second light guide units form a plurality of surfaces having thicknesses in a direction perpendicular to a light guide direction and guide picture lights by total reflection using the plurality of surfaces. In this case, the picture lights are guided by total reflection using the plurality of surfaces, and a picture as a virtual image may be visually recognized by the observer. Further, the units have the thicknesses in the direction perpendicular to the light guide direction and can form an image at an angle of view sufficient in the mode, and the first and second light guide units have functions of keeping the strength of the whole apparatus.

In still another aspect of the invention, the center portion has a screwing and fixing portion that screws and fixes the first and second light guide units. In this case, stronger fixation can be made by screwing and fixing.

In still another aspect of the invention, the screwing and fixing portion has a plate-like retaining fitting forming fixing surfaces for sandwiching and fixing the first and second light guide units. In this case, planar holding and fixation may be performed by the plate-like retaining fitting, and fixation with sufficient strength can be made.

In still another aspect of the invention, the retaining fitting has a shape uniformly spreading to left and right according to placement of the first and second light guide units. In this case, the first and second light guide units may be uniformly planarly held and fixed.

In still another aspect of the invention, the retaining fitting is in contact with surfaces of the protruding portions formed on the end sides extending toward the center portion of the first and second light guide units. In this case, the surfaces of the protruding portions may be planarly held and fixed.

In still another aspect of the invention, the screwing and fixing portion has a plurality of screwing holes, and the first and second light guide units respectively have screwing portions having U-shaped structures corresponding to the plurality of screwing holes. In this case, the screwing portions have the U-shaped structures, and thereby, for example, when coating treatment necessary for the first and second light guide units is performed, liquid dripping in the screwing portions may be suppressed.

In still another aspect of the invention, the screwing and fixing portion has three or more screwing holes. In this case, fixation may be made by the planar action, and thereby, fixation with sufficient strength can be made.

In still another aspect of the invention, the screwing and fixing portion has three screwing holes for three-point fixation by fixing the first and second light guide units at total two points of one point each and at the other one point at the center of the frame part. In this case, in assembly of the light guide units, easy and reliable positioning and fixation can be performed.

In still another aspect of the invention, the first and second light guide units superimpose picture lights and lights from the outside world to be respectively visually recognized. In this case, see-through visual recognition can be performed.

In still another aspect of the invention, the frame part has a magnesium frame as a support extending from the center portion along the first and second light guide units. In this case, the lightweight frame part with sufficient strength may be formed.

BRIEF DESCRIPTION OF THE DRAWINGS

The invention will be described with reference to the accompanying drawings, wherein like numbers reference like elements.

FIG. 2A is a front view of the virtual image display apparatus and FIG. 2B is a side sectional view of the apparatus.

FIGS. 8A and 8B are diagrams for explanation of a structure of a center portion of a frame part.

DESCRIPTION OF EXEMPLARY EMBODIMENTS

Figure 1:
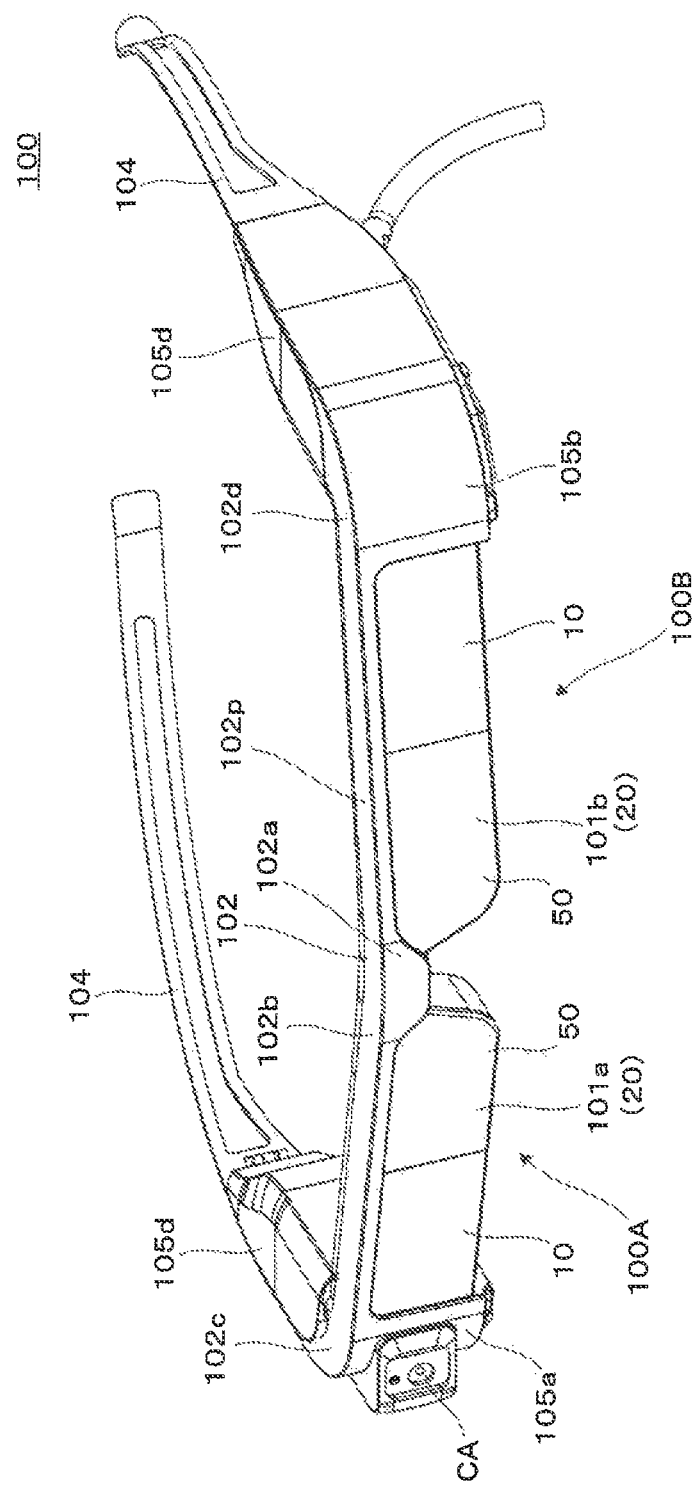
FIG. 1 is a perspective view for explanation of an appearance of an example of a virtual image display apparatus according to an embodiment.
Figures 3A, 3B:
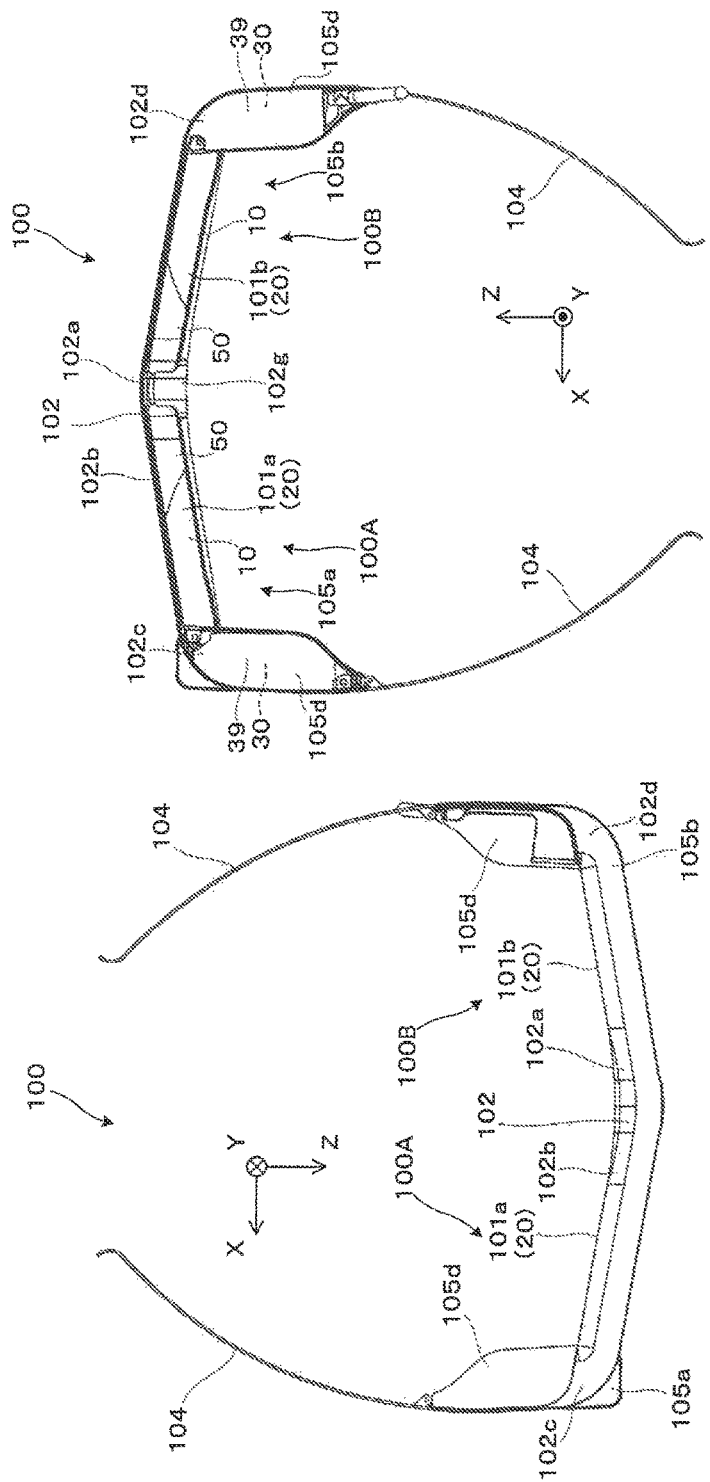
FIG. 3A is a plan view of the virtual image display apparatus and FIG. 3B is a bottom view of the apparatus.

As below, one embodiment of a virtual image display apparatus according to the invention will be explained in detail with reference to FIG. 1 etc.

As shown in FIGS. 1, 2A, 2B, 3A, and 3B, a virtual image display apparatus 100 of the embodiment is a head mount display having an appearance like spectacles, and allows an observer or a user wearing the virtual image display apparatus 100 to visually recognize image lights (picture lights) by virtual images and visually recognize or observe images of the outside world in see-through vision. The virtual image display apparatus 100 includes a first display apparatus 100A, a second display apparatus 100B, and a frame part 102.

The first display apparatus 100A and the second display apparatus 100B are parts that respectively form virtual images for right eye and and left eye, and respectively include first and second optical members 101a, 101b that cover the fronts of the eyes of the observer to allow see-through vision and first and second image formation main body parts 105a, 105b. The first and second image formation main body parts 105a, 105b, which will be described later, each include an optical system, a display device (picture device, image display device), etc. for image formation such as a projection lens 30 to be housed in a lens tube part 39 (for example, see FIG. 3B, 11, etc.) The first and second optical members 101a, 101b are light guide units that guide picture lights formed in the first and second image formation main body parts 105a, 105b and superimpose lights from the outside world and the picture lights to be visually recognized and form light guide devices. Hereinafter, the first optical member 101a or the second optical member 101b is also referred to as "light guide device 20". Note that the first display apparatus 10A and the second display apparatus 100B may singly function as virtual image display apparatuses.

The frame part 102 is an elongated member bending in a U-shape and a metal integrated component. Here, as an example, the frame part 102 is formed using a magnesium alloy. In other words, the frame part 102 has a main body portion 102p formed with a magnesium frame as the metal integrated component. Further, as shown in the drawings, the frame part 102 includes a center portion 102a having a thick structure provided to connect to both the first optical member 101a and the second optical member 101b (the light guide devices 20 as a pair of light guide units) and a support 102b extending from the center portion 102a along the first and second optical members 101a, 101b and forming portions bending in the U-shape. Note that, in this case, the support 102b is formed by the magnesium frame.

The center portion 102a sandwiches the end sides of the first and second optical members 101a, 101b, and thereby, fixes the relative positions of the members. In addition, the support 102b forms first and second periphery portions 102c, 102d as portions bending in the U-shape and is connected (assembled) to the first and second optical members 101a, 101b in the first and second periphery portions 102c, 102d, and thereby, further strengthens the mutual fixation. Note that, in the above description, the case of forming the frame part 102 by the magnesium frame is taken as an example, however, the frame part 102 may be formed principally using e.g. aluminum or the like.

Note that temples 104 as temple parts extending rearward from both ends on the left and right of the frame part 102 are provided so that the frame part may be supported in contact with the ears, temples, or the like of the observer. Further, the first and second image formation main body parts 105a, 105b may be added to the parts from the frame part 102 to the temples 104.

Figure 4:
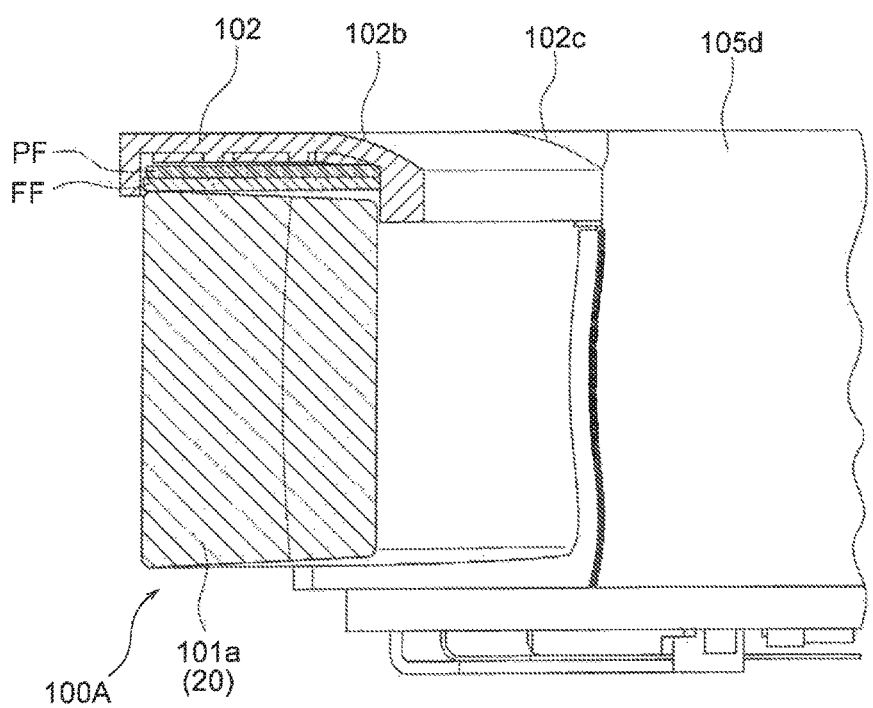
FIG. 4 shows an example of the virtual image display apparatus in a partially enlarged side sectional view.

Note that, as shown in FIG. 4, a wiring member PF for transmission of various signals and power supply is housed within a space provided between the frame part 102 and the light guide device 20. The wiring member PF is partitioned by e.g. a plate-like member FF or the like and not in direct contact with members forming an optical system, a member for assembly of the members, or the like. Further, the plate-like member FF also functions as a light shielding member and suppresses such an event that unintended lights enter and are recognized as stray lights (leakage lights) or the like when picture lights are guided in the light guide device 20.

Figure 5:
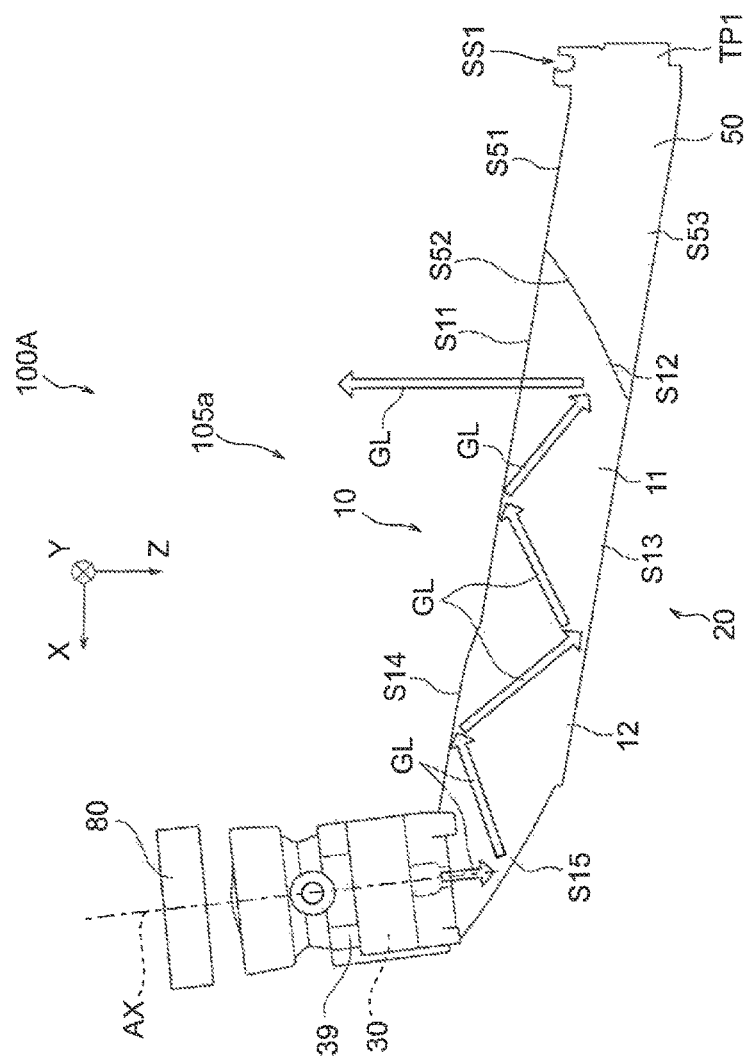
FIG. 5 is a diagram for conceptual explanation of optical paths of picture lights.

As below, referring to FIG. 5, an example of the structure for guiding picture lights by the virtual image display apparatus 100 etc. will be conceptually explained. Note that, as described above, the apparatuses for guiding picture lights are the first display apparatus 100A and the second display apparatus 100B (see FIG. 1 etc.), however, the first display apparatus 100A and the second display apparatus 100B have symmetric and equal structures and only the first display apparatus 100A will be explained and the explanation of the second display apparatus 100B will be omitted. As shown in FIG. 5, the first display apparatus 100A includes an image display device 80 that forms picture lights, a projection lens 30 for imaging to be housed in the lens tube part 39, and the light guide device 20 (first optical member 101a) that guides picture lights that have passed through the image display device 80 and the projection lens 30. The light guide device includes a light guide member 10 for light guide and see-through vision and a light transmissive member 50 for see-through vision.

The image display device 80 may be a picture display device (picture device, image display device) including a self-emitting device such as an organic EL, for example. Further, the device may be a picture display device (picture device, image display device) as e.g. a transmissive spatial light modulation device or may have an illumination device (not shown) as a backlight that outputs illumination light to the picture die-play device (image display device) and a drive control unit (not shown) that controls operations.

The projection lens 30 is a projection system including a plurality of (for example, three) optical elements (lenses) arranged along an incident-side optical axis AX as component elements, and these optical elements are housed and supported by the lens tube part 39 as described above. The optical elements each include an aspheric lens containing both a non-axisymmetric aspheric surface and an axis metric aspheric surface, and form an intermediate image corresponding to a display image inside of the light guide member 10 in cooperation with a part of the light guide member 10. The projection lens 30 projects the picture lights formed by the image display device 80 on the light guide device 20 and allows the lights to enter the device.

As described above, the light guide device 20 includes the light guide member 10 for light guide and see-through vision and the light transmissive member 50 for see-through vision. The light guide member 10 is a part of the prism-shaped light guide device 20 and an integrated member, however, may be regarded as a division into the first light guide portion 11 on the light-exiting side and the second light guide portion 12 on the light-incident side. The light transmissive member 50 is a member that assists the see-through function of the light guide member 10 (auxiliary optical block) and integrally fixed to the light guide member 10 into one light guide device 20. The light guide device 20 is screwed into the lens tube part 39, for example, and accurately positioned and fixed to the projection lens 30. Note that the lens tube part 39 may be made of a black resin.

The light guide member 10 has first to fifth surfaces S11 to S15 as side surfaces having optical functions. Of the surfaces, the first surface S11 and the fourth surface S14 are continuously contiguous and the third surface S13 and the fifth surface S15 are continuously contiguous. Further, the second surface S12 is placed between the first surface S11 and the third surface S13. A half-mirror layer is provided on the second surface S12. The half-mirror layer is a reflection film having light transmissivity (i.e., semi transmissive reflection film) and formed by deposition of a metal reflection film or a dielectric multilayer film, and has reflectance appropriately set for picture lights.

As below, referring to FIG. 5, optical paths of picture lights (here, picture lights GL) will be schematically explained. The light guide member 10 allows the picture lights GL to enter from the projection lens 30 and guides the lights toward the eye of the observer by reflection etc. using the first to fifth surfaces S11 to S15. Specifically, the picture Lights GL from the projection lens 30 first enter the fourth surface S14, are reflected by the fifth surface S15, enter the fourth surface S14 from inside again and are totally reflected, enter the third surface S13 and are totally reflected, and enter the first surface S11 and are totally reflected. The picture lights GL totally reflected by the first surface S11 enter the second surface S12, are partially reflected while being partially transmitted through the half mirror layer provided on the second surface S12, and enter the first surface S11 again and pass through the surface. The picture lights GL that have passed through the first surface S11 enter the eye of the observer or an equal position thereto as nearly parallel pencils of rays. That is, the observer observes an image by the picture lights as a virtual image.

As described above, the light transmissive member 50 is integrally fixed to the light guide member 10 to form one light guide device 20 and the member that assists the see-through function of the light guide member 10 (auxiliary optical block). The light transmissive member 50 has a first transmissive surface S51, a second transmissive surface S52, and a third transmissive surface S53 as side surfaces having optical functions. The second transmissive surface S52 is provided between the first transmissive surface S51 and the third transmissive surface S53. The first transmissive surface S51 is on a surface as an extension of the first surface S11 of the light guide member 10, and the second transmissive surface S52 is a curved surface joined to and integrated with the second surface S12, and the third transmissive surface S53 is on a surface as an extension of the third surface S13 of the light guide member 10.

The light guide device 20 allows the observer to visually recognize the picture lights using the light guide member 10 as described above and to observe an outside world image with less distortion in cooperation between the light guide member 10 and the light transmissive member 50. That is, of the lights from the outside world as component lights forming an outside world image to be visually recognized, the light entering closer to the +X side than the second surface S12 of the light guide member 10 passes through the third surface S13 and the first surface S11 of the first light guide portion 11 and, in this regard, almost no aberration or the like is generated because the third surface S13 and the first surface 311 are nearly in parallel to each other (diopter scale nearly zero). Further, of the lights from the outside world, when the light entering closer to the −X side than the second surface S12 of the light guide member 10, i.e., the light entering the light transmissive member 50 passes through the third transmissive surface S53 and the first transmissive surface S51 provided therein, no aberration or the like is generated because the third transmissive surface S53 and the first transmissive surface S51 are nearly in parallel to each other. Furthermore, of the lights from the outside world HL, when the light entering the light transmissive member 50 corresponding to the second surface S12 of the light guide member 10 passes through the third transmissive surface S53 and the first surface S11, almost no aberration or the like is generated because the third transmissive surface S53 and the first surface S11 are nearly in parallel to each other. In the above described manner, the observer observes an outside world image without distortion through the light transmissive member 50.

Further, the light guide device 20 has a certain thickness (e.g. about several millimeters) in a direction perpendicular to a light guide direction in which the picture lights GL travel, and forms the plurality of surfaces S11 to S15 as described above, and guides the picture lights GL by total reflection using the plurality of surfaces S11 to S15. In this case, the device has the thickness in the direction perpendicular to the light guide direction and can form an image at an angle of view sufficient in the mode, and the light guide device 20 itself has a certain degree of strength and also a function of keeping the strength as the whole virtual image display apparatus 100.

The above described configuration is the same in the second display apparatus 100B (see FIG. 1 etc.) Thereby, images respectively corresponding to the left and right eyes can be respectively formed.

Figures 6A, 6B:
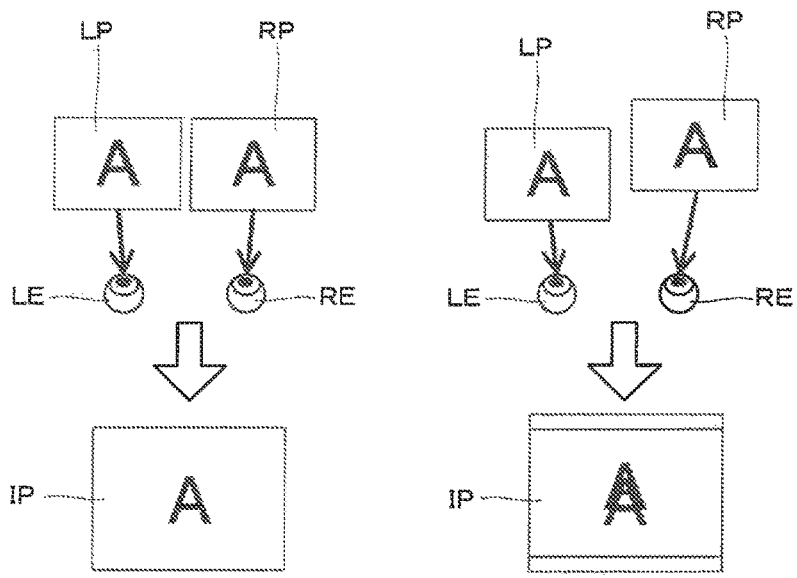
FIG. 6A is a diagram for conceptual explanation of recognition of images without misalignment and FIG. 6B is a diagram for conceptual explanation of recognition of images with misalignment.

As described above, when the images respectively corresponding to the left and right eyes are formed by the pair of display apparatuses 100A, 100B, if image display misalignment between left and right is significant in binocular vision, the observer may be difficult to continue viewing of pictures because recognition in perfect alignment of left and right images is impossible. FIG. 6A conceptually shows recognition of images without misalignment.

In specific explanation, FIG. 6A shows a state in which, when an image RP formed by the first display apparatus 100A for right eye (see FIG. 1 etc.) is visually recognized by a right eye RE of the observer and an image LP formed by the second display apparatus 100B for left eye (see FIG. 1 etc.) is visually recognized by a left eye LE of the observer, there no misalignment of the relative positions of the image RP and the image LP and the images reach the respective eyes RE, LE at intended angles. In this case, the observer may recognize a single image in perfect alignment as shown by an image picture IP based on information obtained from both eyes LE, RE of his or her own. On the other hand, as shown in FIG. 6E, when misalignment occurs in the relative positions of the image RP and the image LP, it may be possible that the observer can not recognize an image without misalignment based on the information obtained from both eyes LE, RE of his or her own and, for example, recognizes the images in a condition shown by an image picture IP. For example, if misalignment of several pixels or more is produced, the condition may be caused. To prevent the condition, it is very important that the pair of left and right display apparatuses are firmly positioned and fixed so that the relative misalignment between the apparatuses for right eye and left eye may not be larger, and have sufficient strengths so that distortion of the product or the like may not be produced after assembly of the respective parts. However, generally, the observer wears the virtual image display apparatus, and thus, there are very strong demands for reduction in weight and size. Therefore, for example, when the entire frame side supporting the light guide units is strengthened, reduction in weight and size on the frame side is naturally restricted. On the other hand, in the invention of the application, as described above, the center portion 102a of the frame part 102 has the thick structure, and thereby, strong fixation can be made and the strength of the entire frame part 102 is not necessarily required by maintenance of accuracy and strength in cooperation with other members and the reduction in weight and size of the whole apparatus is realized.

As below, referring to FIG. 7 etc., the structure of the center portion 102a of the frame part 102 etc. will be explained in further detail.

Figure 7:
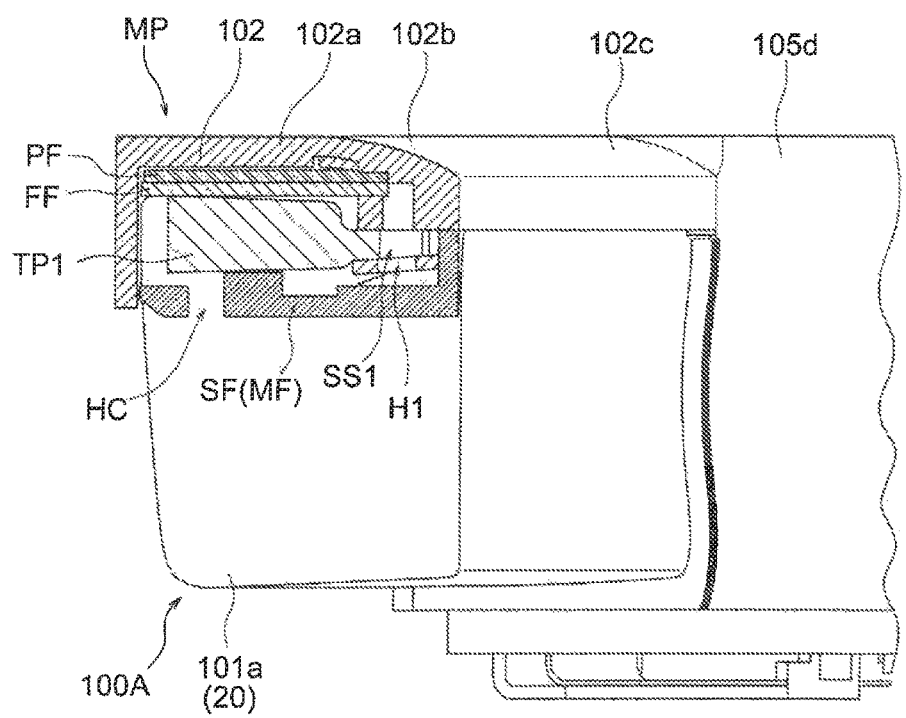
FIG. 7 shows another example of the virtual image display apparatus in a partially enlarged side sectional view.

FIG. 7 shows an example of a side section of the virtual image display apparatus 100, and specifically shows a sectional structure of the center portion 102a of the frame part 102. Further, FIGS. 8A and 8E are diagrams for explanation of the structure of the center portion 102a (as seen from the bottom side) in which the respective parts forming the center portion 102a are drawn with a part omitted for clear view of the other parts. Further, FIG. 9 shows the structure of the center portion 102a as seen from another angle (from the rear side) in which the pair of light guide devices 20 are sandwiched by the center portion 102a.

As shown in FIGS. 7, 8A, 8E, etc., the center portion 102a has a center supporting portion MP forming a part of the support 102b as the magnesium frame and the center part, and a screwing and fixing portion SF that sandwiches and fixes the pair of light guide devices 20 in cooperation with the center supporting portion MP. Note that the screwing and fixing portion SF is covered by a cover member 102g (see FIG. 3B etc.) The screwing and fixing portion SF includes a plate-like retaining fitting MF as a major member and screws (not shown) for fastening the retaining fitting MF. The retaining fitting MF is a plate-like member molded using stainless steel (SUS) and having a thickness of about 0.6 mm, for example, and has a shape uniformly spreading to right and left like an isosceles trapezoid or isosceles triangle (or equilateral triangle). Further, the retaining fitting MF has a first hole H1 and a second hole H2 as holes for screwing (screwing holes) provided in correspondence with the pair of light guide devices 20 (first and second optical members 101a, 101b), and further has a center hole HC between the holes. In the more detailed explanation of the position relationship among the holes HC, H1, H2, the center hole HC is provided in a center location between the first hole H1 and the second hole H2 at equal distances or nearly equal distances from the holes and a location not on a line from the first hole H1 to the second hole H2. In other words, these three screwing holes HC, H1, H2 are not arranged on a line with respect to each other and located on vertices of the isosceles triangle (or equilateral triangle) in the plan view. Note that, in the center supporting portion MP, screw receiving holes GC, G1, G2 corresponding to the screwing holes HC, H1, H2, respectively, are provided and the screws are attached from the screwing holes HC, H1, H2 to the screw receiving holes GC, G1, G2 and fastened. Thereby, in the center portion 102a, the pair of light guide devices 20 (first and second optical members 101a, 101b) may be sandwiched with planar pressure with balance. In the above described configuration, the retaining fitting HF has a shape corresponding to those three screwing holes HC, H1, H2. In other words, the retaining fitting MF has the isosceles trapezoidal shape or the like, and thus, the respective ends extend uniformly to right and left along the respective sides of the triangle having the vertices of the three screwing holes HC, H1, H2. Thereby, when the light guide devices 20 in the pair of the left and the right are sandwiched and fixed, the fitting acts to planarly hold the devices with balance on both ends in the positions of the screwing holes.

Further, for example, as shown in FIG. 8A etc., on the end sides (sides extending toward the center portion 102a) of the pair of light guide devices 20 (first and second optical members 101a, 101b), plate-like protruding portions TP1, TP2 as portions sandwiched by the center portion 102a are respectively formed, and screwing portions SS1, SS2 having U-shape structures corresponding to the screwing holes H1, H2 (and the screw receiving holes G1, G2) of the screwing and fixing portion SF are formed in the protruding portions TP1, TP2, respectively. The screwing portions SS1, SS2 are sandwiched by portions forming the screw holes H1, H2 of the retaining fitting MF and portions forming the screw receiving holes G1, G2 of the center supporting portion MP. Note that the screwing portions SS1, SS2 have the U-shaped structures, and thereby, in deposition processing of e.g. hard coating layers or the like on the light guide devices 20, dripping and accumulation of the coating liquid on the screwing portions SS1, SS2 may be suppressed.

Figure 9:
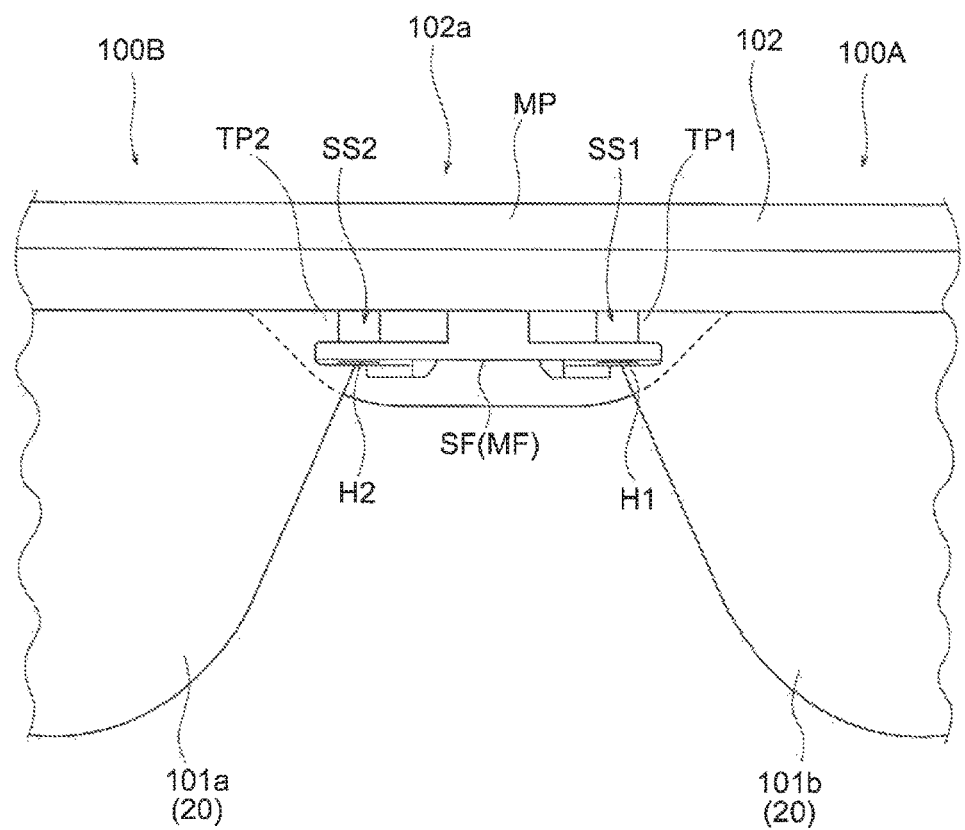
FIG. 9 shows the structure of the center portion of the frame part as seen from another angle.

Note that, as known from FIG. 9, for example, if the retaining fitting MF has concavities and convexities in the height direction (Y direction), some space can be provided in the center portion 102a, and, for example, a member for attachment of an inner frame, a nose receiving portion (nose pad), etc. may be provided by insertion or the like using the space.

Figure 10A:
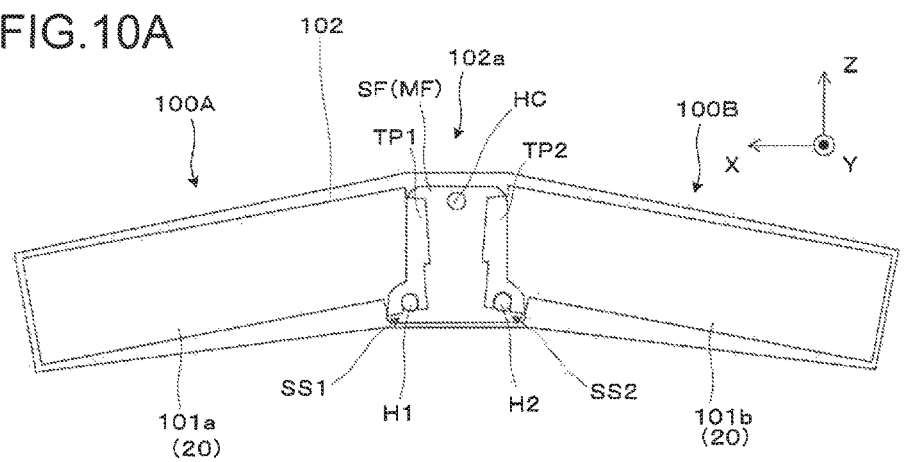
FIGS. 10A to 10C are diagrams for conceptual explanation of connection of light guide units in the center portion of the frame part.
Figure 10B:
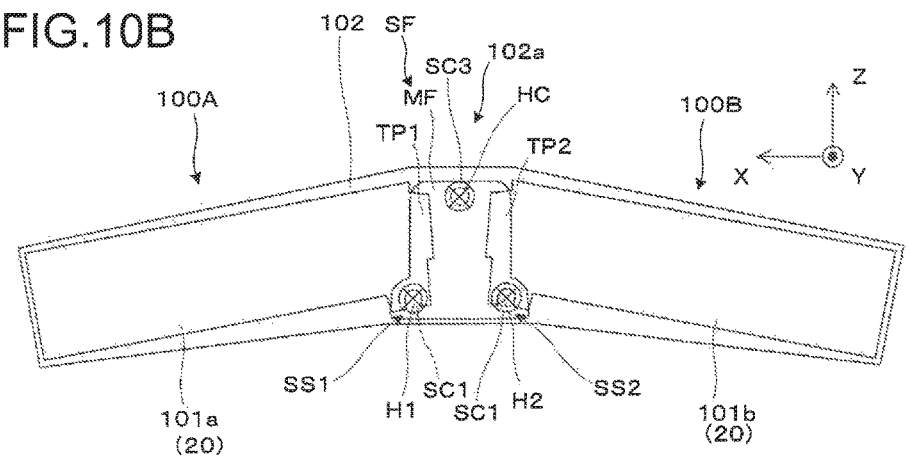
Figure 10C:
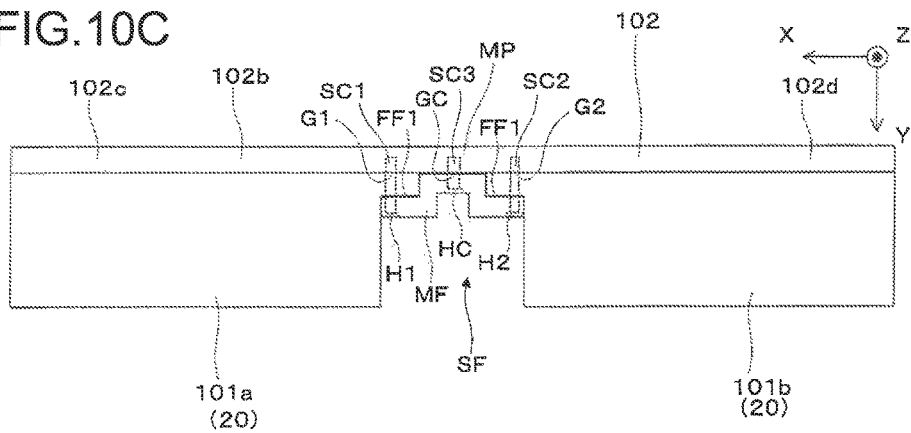

As below, referring to conceptual illustration in FIGS. 10A to 10C, an example of a state of fixation of the pair of light guide devices 20 (first and second optical members 101a, 101b) by the center portion 102a having the screwing and fixing portion SF as described above will be explained more specifically. First, in this case, for example, as shown in FIG. 10A of the respective drawings, of the screwing and fixing portion SF having the three screwing holes HC, H1, H2 (retaining fitting MF), adjustment of the relative position relationship between the pair of light guide devices 20, i.e., the attitude including an angle formed by the devices, height positions of the devices, etc. is performed in correspondence of the screwing portions SS1, SS2 of the pair of light guide devices 20 with the first hole H1 and the second hole H2. Then, as shown in FIGS. 10B and 10C, the three screwing holes HC, H1, H2 are screwed using screws SC1 to SC3 forming the screwing and fixing portion SF, and thereby, the pair of light guide devices 20 are fixed with maintenance of their relative position relationship. In this case, of the pair of light guide devices 20, the protruding portion TP1 as one plate-like end portion is planarly held in plane contact with the plate-like retaining fitting MF by fastening of the screw SC1 and the screw SC3, and the protruding portion TP2 as the other plate-like end portion is planarly held in plane contact with the plate-like retaining fitting MF by fastening of the screw SC2 and the screw SC3. Further, in this case, the pair of light guide devices 20 are planarly held and fixed by screwing in three parts by fixing surfaces FF1 and a surface on the center supporting portion MP of the retaining fitting MF, and thereby, a thick structure in the front-back direction (the Z direction in the drawing) is obtained and assembly becomes stronger. In addition to screwing with certain thicknesses in the height direction (the Y direction in the drawing) provided to the protruding portions TP1, TP2 in the direction, for example, stainless steel (SUS) having a certain thickness is used for the retaining fitting MF, and thereby, a thick structure is also obtained in the height direction and the assembly becomes stronger. Particularly, in the illustrated example, as shown in FIG. 10C, the retaining MF has concavities and convexities in the height direction (Y direction) in the part of the center hole HC and the part of the center hole HC has a shape protruding toward the center supporting portion MP and left reliably and uniformly, and improvements in strength and stability in screwing fixation may be expected. Further, the pair of light guide devices 20 on the left and right are fastened at three points by fixing at the total two points of one point each and fixing at the other one point at the center of the frame part 102, and three-point fixation for reliable on the left and the right may be realized. This enables easier positioning compared to e.g. four-point fixation and may be easily applied to a mode of fixation while making position adjustment as appropriate or the like. In the above described manner, the center portion 102a having the thick structure is formed. Note that, in the above description, screwing is performed in four or more points as long as stability of accuracy or the like in fixation may be secured.

As described above, in the embodiment, in the frame part 102, the center portion 102a having the thick structure is provided between the first optical member 101a as the first light guide unit and the second optical member 101b as the second light guide unit to connect to both members and the relative positions of the first optical member 101a and the second optical member 101b may be fixed by the center portion 102a, and thereby, for example, in comparison to a configuration in which the frame part serves to support and fix the whole optical system in an integrated fashion, reduction in weight and size of the frame part 102 and reduction in weight and size of the whole apparatus may be realized and image display misalignment between left and right in binocular vision may be suppressed by the center portion 102a.

Figure 11:
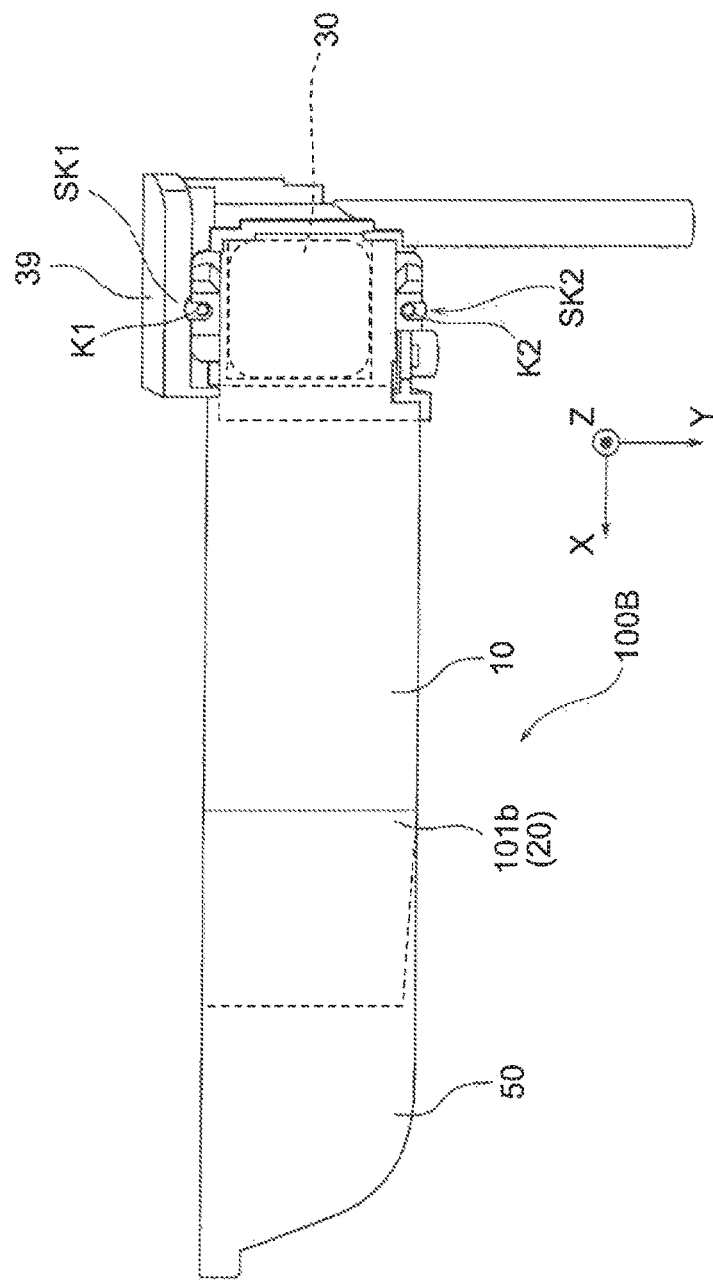
FIG. 11 is a diagram for explanation of assembly of the light guide unit to a lens tube part.
Figure 12A:
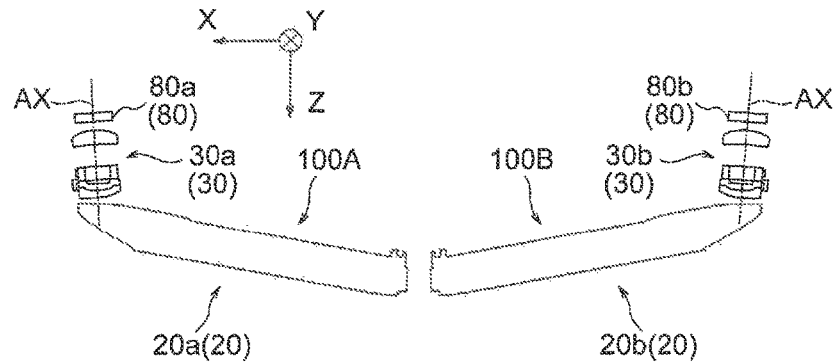
FIGS. 12A to 12C are diagrams for explanation of assembly of the light guide units and the lens tube parts to the frame part.
Figure 12B:
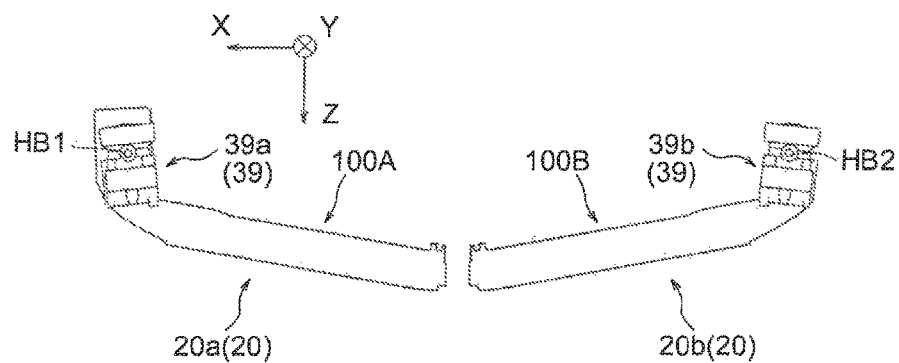
Figure 12C:
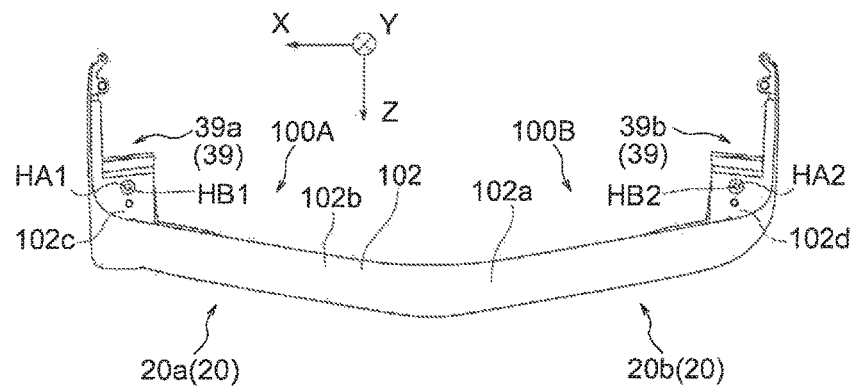

As below, referring to FIG. 11 etc., assembly of the projection lens 30 etc. on the opposite side (base side) to the connection side (end side) to the center portion 102a of the first and second optical members 101a, 101b (light guide devices 20) as the respective light guide units on the left and right will be explained. FIG. 11 is a diagram for explanation of assembly of the light guide device 20 as the light guide unit (the second optical member 101b in the illustrate example) to the lens tube part 39. In this case, as shown in the drawing, the light guide device 20 is screwed and fixed in two parts of an upper first hole K1 and a lower second hole K2 provided in the lens tube part 39 housing the projection lens 30 with respect to the height direction (Y direction). That is, in the light guide device 20, screwing portions SK1, SK2 having U-shaped structures are formed in correspondence with the first hole K1 and the second hole K2, respectively. Note that, though illustration and explanation are omitted, the same applies to the light guide device 20 (first optical member 101a) as the other light guide unit. The assembly of the light guide units (pair of light guide devices 20) and the corresponding pair of lens tube parts 39 to the frame part 102 in the above described configuration will be explained with reference to FIGS. 12A to 12C. FIGS. 12A to 12C correspond to FIG. 3A, which are drawn with a part of the configuration omitted from the state shown in FIG. 3A for clear view of the respective parts. First, as shown in FIG. 12A, only the optical systems are shown, and the pair of display apparatuses 100A, 100B include first and second image display devices 80a, 80b, first and second projection lenses 30a, 30b, first and second guide devices 20a, 20b i.e. the first and second optical members 101a, 101b, respectively. Of them, as shown in FIG. 12B, the first and second projection lenses 30a, 30b are housed in the first and second lens tube parts 39a, 39b and the first and second light guide devices 20a, 20b are assembled and fixed to the first and second lens tube parts 39a, 39b. Note that screw receiving holes HB1, HB2 for fixation to the frame part 102 are provided in the first and second lens tube parts 39a, 39b. Further, as shown in FIG. 12C, the first and second lens tube parts 39a, 39b have the screw receiving holes HB1, HB2 corresponding to e.g. screw holes HA1, HA2 or the like with respect to the first and second periphery portions 102c, 102d of the frame part 102, and thereby, are screwed and fixed in the parts. In the summary in view of fixation of the relative positions of the light guide units, the first and second light guide devices 20a, 20b as the first and second light guide units are connected to the first and second lens tube parts 39a, 39b housing the first and second projection lenses 30a, 30b on the base side and connected and fixed to the first and second periphery portions 102c, 102d of the frame part 102 via the first and second lens tube parts 39a, 39b, respectively. In the above described case, the respective light guide devices 20 are fixed in the center portion 102a on the center sides closer to the nose when worn and fixed by the first periphery portion 102c and the second periphery portion 102d on the periphery sides closer to the ears. The devices are fixed in two points apart from each other, and thereby, image display misalignment between left and right may be further suppressed.

OTHER EXAMPLES

As above, the invention is explained according to the embodiment. However, the invention is not limited to the above described embodiment, but may be implemented in various forms without departing from the scope thereof.

In the above description, as the image display device 80, various devices may be used. For example, a configuration using a reflective liquid crystal display device can be employed, and a digital micromirror device or the like may be used in place of the picture display device (image display device) including the liquid crystal display device.

In the above description, the half mirror layer on the second surface S12 is e.g. the metal reflection film or the dielectric multilayer film, however, the layer may be replaced by a planar or curved hologram element.

In the above description, the light guide member 10 etc. extend in the lateral direction in which the eyes are aligned, however, the light guide member 10 may be provided to extend in the longitudinal direction. In this case, the light guide member 10 has a parallel-arrangement structure, not the series-arrangement structure.

In the above description, only the mode of superimposing the image lights and the lights from the outside world is explained, however, for example, the invention may be applied to a virtual image display apparatus that enables observation by switching between a mode of only the picture lights and a mode of only the lights from the outside world without superimposition.

The technology of the invention of this application may be adapted to the so-called video see-through product including a display and an imaging apparatus.

The entire disclosure of Japanese Patent Application No. 2015-256068, filed Dec. 28, 2015 is expressly incorporated by reference herein.

What is claimed is:

1. A virtual image display apparatus comprising:
   a first light guide and a second light guide provided in a pair corresponding to left and right eyes and respectively guiding picture lights to be visually recognized, the first light guide having a first protruding portion extending toward the second light guide, and the second light guide having a second protruding portion extending toward the first light guide; and
   a frame part including a center portion, the center portion sandwiching the first protruding portion and the second protruding portion, the center portion fixing a relative position of the first light guide to the second light guide.

2. The virtual image display apparatus according to claim 1, wherein:
   the frame part includes a support extending from the center portion along the first light guide and the second light guide,
   the support forms a first periphery portion and a second periphery portion corresponding to base sides of the first light guide and the second light guide, respectively, and
   the first light guide and the second light guide are fixed to the first periphery portion and the second periphery portion of the support, respectively.

3. The virtual image display apparatus according to claim 1, wherein the first light guide and the second light guide are respectively connected to a first lens tube part and a second lens tube part, the first lens tube part and the second lens tube part respectively housing a first projection lens and a second projection lens configured to allow picture lights from a picture device to enter the first light guide and the second light guide on base sides, respectively, and the first projection lens and the second projection lens are fixed to the frame part by the first lens tube part and the second lens tube part, respectively.

4. The virtual image display apparatus according to claim 1, wherein the first light guide and the second light guide are configured to:
   form a plurality of surfaces having thicknesses in a direction perpendicular to a light guide direction, and
   guide picture lights by total reflection using the plurality of surfaces.

5. The virtual image display apparatus according to claim 1, wherein the center portion includes a screwing and fixing portion fixing the first light guide and the second light guide to the center portion.

6. The virtual image display apparatus according to claim 5, wherein the screwing and fixing portion includes a plate-like retaining fitting forming fixing surfaces configured to sandwich and fix the first and second light guides.

7. The virtual image display apparatus according to claim 6, wherein the retaining fitting has a shape uniformly spreading from the center portion based on a position of the first light guide and the second light guide.

8. The virtual image display apparatus according to claim 6, wherein the retaining fitting contacts surfaces of the first and second protruding portions formed on respective end sides of the first and second light guides and extending toward the center portion.

9. The virtual image display apparatus according to claim 5, wherein:
   the screwing and fixing portion includes a plurality of screwing holes, and
   the first light guide and the second light guide each have screwing portions having U-shaped structures corresponding to the plurality of screwing holes.

10. The virtual image display apparatus according to claim 5, wherein the screwing and fixing portion has three or more screwing holes.

11. The virtual image display apparatus according to claim 5, wherein the screwing and fixing portion has three screwing holes for a three-point fixation, each one of the three screwing holes fixing one of either the first light guide, the second light guide, or the center portion of the frame part.

12. The virtual image display apparatus according to claim 1, wherein the first light guide and the second light guide are configured to superimpose picture lights and lights from the outside world such that the first light guide and the second light guide are visually recognized in relation to each other.

13. The virtual image display apparatus according to claim 1, wherein the frame part includes a magnesium frame as a support extending from the center portion along the first light guide and the second light guide.

14. The virtual image display apparatus according to claim 1, further comprising a wiring member disposed between the frame part and the first light guide and the second light guide.

15. The virtual image display apparatus according to claim 14, wherein the wiring member is configured to transmit at least one of (i) signals and (ii) power to the first light guide and the second light guide.

16. The virtual image display apparatus according to claim 14, further comprising a plate-like member disposed between the wiring member and the first light guide and the second light guide.

17. The virtual image display apparatus according to claim 16, wherein the plate-like member is configured to suppress light from leaking through gaps in the frame part.

18. A virtual image display apparatus comprising:
   a first light guide and a second light guide corresponding to left and right eyes and guiding picture lights to be visually recognized, the first light guide and the second light guide including corresponding protruding portions extending toward a center portion; and
   an elongated frame part formed in a U-shape, the frame part including the center portion and sandwiching the protruding portions of the first light guide unit and the second light guide.

19. The virtual image display apparatus according to claim 18, wherein the frame part is a metal integrated component composed of at least a magnesium alloy.

20. The virtual image display apparatus according to claim 18, further comprising a wiring member disposed between the frame part and the first light guide and the second light guide.

* * * * *